United States Patent [19]

Rix et al.

[11] 4,037,698

[45] July 26, 1977

[54] CENTRIFUGAL COUPLING

[75] Inventors: Albert Rix; Hans Fuchs; Jens Onuscheit, all of Wilhelmshaven, Germany

[73] Assignee: Olympia Werke AG, Wilhelmshaven, Germany

[21] Appl. No.: 511,914

[22] Filed: Oct. 3, 1974

[30] Foreign Application Priority Data

Nov. 10, 1973 Germany .............................. 2356247

[51] Int. Cl.² ............................................ F16D 23/10
[52] U.S. Cl. .............................................. 192/105 CE
[58] Field of Search ................... 192/105 CF, 105 CP, 192/105 CD, 105 CE, 103 R

[56] References Cited

U.S. PATENT DOCUMENTS

| 2,065,040 | 12/1936 | Baule | 192/105 CE |
|---|---|---|---|
| 2,647,603 | 8/1953 | Smith | 192/105 CE |
| 3,606,803 | 9/1971 | Ottemann | 74/711 |
| 3,625,326 | 12/1971 | Rix | 192/105 CE |
| 3,659,688 | 5/1972 | Schulz | 192/105 CE |
| 3,693,771 | 9/1972 | De Lancey | 192/105 CD |

FOREIGN PATENT DOCUMENTS

| 1,161,153 | 9/1956 | France | 192/105 CE |
|---|---|---|---|
| 930,427 | 7/1955 | Germany | 192/105 CE |

Primary Examiner—Samuel Scott
Assistant Examiner—Wesley S. Ratliff, Jr.
Attorney, Agent, or Firm—Michael J. Striker

[57] ABSTRACT

A centrifugal coupling for connecting a driven rotary component with another rotary component has a pair of flyweights mounted on the driven component for pivoting about pivot axes which are so spaced from one another transversely of the axis of rotation of the rotary component that straight lines intersecting the pivot and center of gravity of the respective flyweight will extend parallel to a plane of symmetry passing through the axis of rotation intermediate the flyweights when the coupling is in an operating position in which it centrifugally couples the two components for joint rotation.

8 Claims, 2 Drawing Figures

CENTRIFUGAL COUPLING

BACKGROUND OF THE INVENTION

This invention relates to a centrifugal coupling.

Centrifugal couplings are already known. They utilize one or more elements which establish an entraining connection between components when the element or elements move from an inoperative position to an operative one under the influence of centrifugal force.

One such prior-art coupling is disclosed in German Pat. No. 1,910,663 (U.S.-Pat. No. 3,625,326) and uses a pair of flyweights which are mounted on a rotary driven shaft so that they can pivot in mutually opposite directions; movement in mutually opposite rather than in a single direction is imposed upon them by contoured elements which enforce such movement. One of the flyweights is formed wtih a coupling flank which cooperates with a coupling portion so as to entrain another component for joint rotation with the shaft. This device constitutes a substantial improvement over analogous devices before it, because the arrangement of the weights for pivoting in mutually opposite directions under the influence of centrifugal force serves to compensate for, and negate, other forces that tend under certain circumstances to become superimposed upon the centrifugal force and to move the weights to an uncoupling position. Such other forces may, for example, be the result of tangential accelerations such as are experienced when the coupling is used in conjuction with an electric drive. The compensation results from the fact that under the influence of tangential accelerations the weights maintain their relative orientation due to d'Alembert's theorem.

However, it has been found that there are still other forces than those resulting purely from tangential acceleration, which act in a negative sense —i.e. in an uncoupling sense— upon the weights of a centrifugal coupling. These forces, which also become superimposed upon the centrifugal force, may for example result from sudden swings or movements of the shaft carrying the weights, when such movements take place in direction transverse to the axis of rotation of the shaft. A sudden take-off of power can cause such movement to occur, as for example when a rubber-mounted motor to which a driveshaft is connectable via the centrifugal coupling, performs a yielding movement when a load is suddenly applied to the shaft. In such an event, or under other circumstances causing analogous movements, the weights of the aforementioned coupling may move to an uncoupling position under the influence of the force resulting from such movement of the shaft, assuming that this force acts substantially in the direction of the axis of symmetry of the flyweights.

SUMMARY OF THE INVENTION

It is the main purpose of this invention to overcome the aforementioned disadvantage.

More specifically, it is an object of the invention to provide an improved centrifugal coupling which avoids such disadvantage.

In particular, it is an object of the invention to provide an improved centrifugal coupling which is so constructed that the flyweights cannot, in their coupling position, be disadvantageously influenced either by forces resulting from tangential acceleration or by forces resulting from accelerations which act transverse to the axis of rotation of the component on which the coupling is provided.

In pursuance of these objects, and of others which will still become apparent, one feature of the invention resides in a centrifugal coupling which, briefly stated, comprises a driven first rotatable component and a rotatable second component which is to be entrained by the first component. A pair of pivotable flyweights is provided, each having a center of gravity. Means is provided for enforcing pivoting of these weights in mutually opposite directions between a rest position and a coupling position. Cooperating coupling portions on the second component and on at least one of the weights engage one another only when the weights are in the coupling position, thus coupling the two components so that the second one may be entrained in rotation by the first component.

According to the invention, pivot means mounts the weights on the first component for pivoting about respective pivot axes which are spaced from one another transversely of the axis of rotation of the first component by a distance which is so selected that imaginary straight lines passing through the respective pivot axes and the center of gravity of the associated flyweight extend in substantial parallelism with a place of symmetry passing midway between the pivot axes and through the aforementioned axis of rotation, such parallelism being in existence when the coupling portions are engaged with one another.

With this construction any sudden accelerations acting upon the coupling substantially in the direction of the plane of symmetry, and acting upon the flyweights, will produce forces in accordance with d'Alembert's theorem as before; however, these forces will now pass precisely through the centers of gravity of the respective weights and will therefore not become superimposed upon the centrifugal forces acting upon the weights. As a result, the orientation of the weights will remain unchanged and movement of the weights to uncoupling position is impossible.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

DESCRIPTION OF THE PREFERRED EMBODIMENTS

Figure 1:
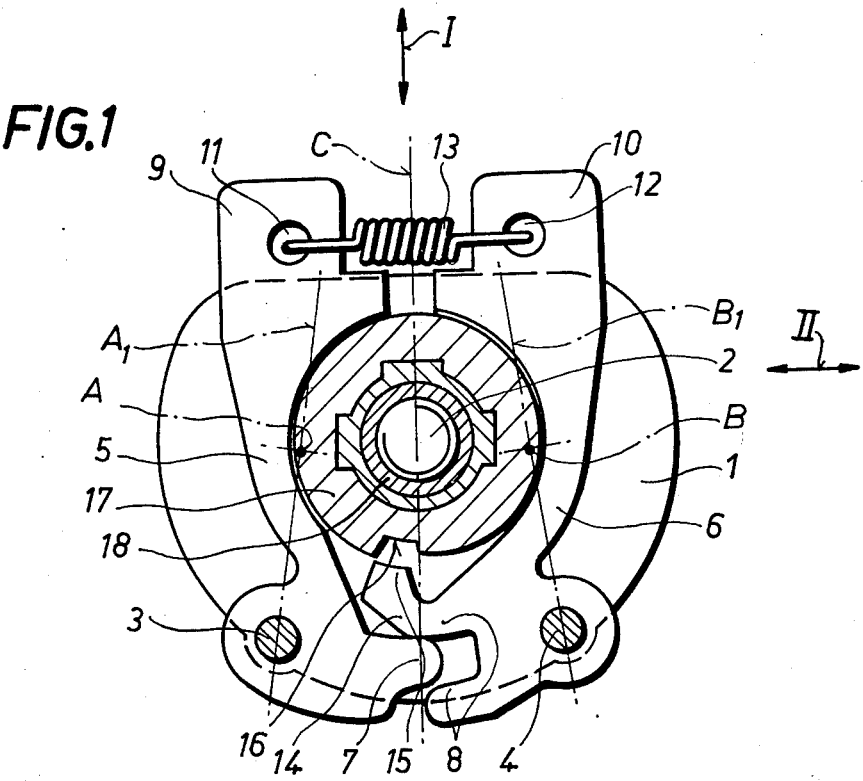
FIG. 1 is a partly sectioned end view of an arrangement embodying the novel coupling, the latter being in its uncoupled rest position.

A driven rotary shaft 2 is formed with a shoulder 1 on which there are provided two bolts or pivots 3, 4 which define pivot axes for respective flyweights of the centrifugal coupling. These pivot axes are located at opposite sides of the axis of rotation of the shaft 2 and of the plane of symmetry C which passes through this axis of rotation midway between te pivot axes. At their ends which are mounted on the pivots 3, 4 the weights 5, 6 are formed with contoured portions 7, 8, respectively, which will be clearly seen to be so configurated than when one of the weights 5, 6 is pivoted in either direction about its pivot, the other weight will be compelled to perform an equal but opposite pivot movement above its pivot. The opposite free ends 9, 10 of the weights 5, 6 are formed with respective holes 11 and 12; a spring 13, here a helical contraction spring, is located between the end portions 9, 10 and has its opposite ends hooked into the holes 11, 12. It thus serves to resiliently bias the weights 5, 6 to the rest position illustrated in FIG. 1.

The component to be driven in rotation by the shaft 2 is another shaft 18 which in this embodiment is coaxially journalled on the shaft 2. The shaft 18 has a shoulder 17 which is formed with a recess 16. The weight 6 is formed with a free arm 14 which defines a nose 15, constituting a coupling portion which can enter into the recess 16 and thus establish an entraining connection between the shafts 2 and 18. This will take place when the weights move to the coupling position shown in FIG. 2 under the influence of centrifugal force.

Figure 2:
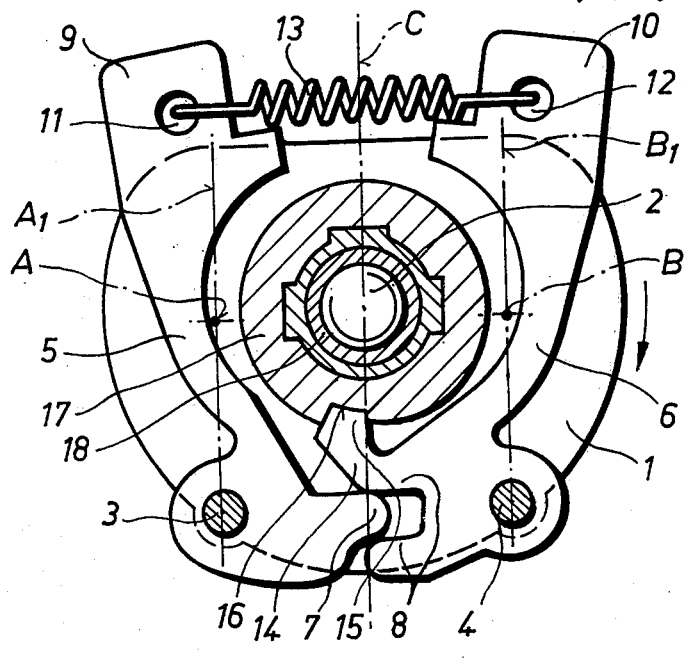
FIG. 2 is a view similar to FIG. 1, but showing the coupling in its operative coupling position.

According to the invention the pivots 3, 4 which define the pivot axes for the weights 5, 6 are spaced from one another transversely of the axis of rotation of the shaft 2 by such a distance that, when the weights are in the coupling position shown in FIG. 2 and the portions 15, 16 are in engagement with one another, straight lines $A_1$ and $B_1$ which pass through the centers of gravity A and B, respectively, of the weights 5, 6, and which also pass through the respective pivot axes, will extend parallel to the plane of symmetry C. In other words, this will be the case when under the influence of centrifugal force the weights 5, 6 have moved against the force of spring 13 from the position of FIG. 1 to that of FIG. 2. The centrifugal force will, of course, result from rotation of the shaft 2.

If the weights are in the position of FIG. 2 and sudden accelerations occur which act in direction transverse of the axis of rotation of the shaft 2, and along the symmetry plane C, as indicated by the double-headed arrow I, this accelerates the weights 5, 6 via their pivots 3, 4 in accordance with d'Alembert's theorem. Since the masses of the individual weights 5, 6 are in a condition of equilibrium relative to their pivots 3, 4 as a result of the inventive construction, it is not possible for any forces to develop which could become superimposed upon the centrifugal force and cause movement of the weights 5, 6 towards their uncoupling position which is shown in FIG. 1.

If, on the other hand, the weights 5, 6 are in the position of FIG. 2 and sudden accelerations occur which again act in direction transverse to the axis of rotation of shaft 2, but which in this instance act normal to the symmetry plane C as indicated by the double-headed arrow II, then the accelerations will act upon the weights via the pivots 3, 4 in the same rotational sense, so that the forces which develop compensate one another via the portions 7, 8. This compensation is the same as that which occurs for the earlier-mentioned tangential accelerations.

It will be understood that each of the elements described above, or two or more together, may also find a useful application in other types of constructions differing from the types described above.

While the invention has been illustrated and described as embodied in a centrifugal coupling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A centrifugal coupling, comprising a first element rotatable about an axis of rotation; a second element having a first coupling portion; and means for entraining said second element for joint rotation with said first element, including a pair of flyweights mounted on said first element for pivoting about respective pivot axes parallel to and equidistant from said axis of rotation, means for connecting said flyweights for simultaneous pivoting away from and toward one another between respective rest and coupling positions thereof, and at least one second coupling portion on one of said flyweights which engages said first coupling portion in said coupling position, each of said flyweights having a center of gravity and a plane defined by the latter and the respective pivot axis, and being acted upon, during the operation of the coupling, by mass-related forces reducible into said center of gravity and resolvable into first components located in said plane, and second components normal to said plane, said entraining means being so constructed that said planes of said flyweights extend parallel to one another in said coupling position and said second components of non-centrigual forces having the same magnitudes act on both of said flyweights in the same direction and result in equal but opposite forces at said connecting means which counteract each other so that said first and second components of said non-centrifugal forces cannot pivot said flyweights from said coupling toward said rest positions thereof.

2. A centrifugal coupling as defined in claim 1, wherein said elements are shafts.

3. A centrifugal coupling as defined in claim 1, wherein said connecting means comprises interengaging portions provided on said flyweights in the region of said pivot means.

4. A centrifugal coupling as defined in claim 1; and further comprising biasing means resiliently urging said flyweights to said rest position.

5. A centrifugal coupling as defined in claim 4, wherein said flyweights are elongated in direction transversely away from the respective pivot axes and have free end portions remote therefrom; and wherein said biasing means engages said free end portions.

6. A centrifugal coupling as defined in claim 5, wherein said biasing means comprises a contraction spring located between and connected to said free end portions.

7. A centrifugal coupling as defined in claim 1, wherein said first coupling portion is a recess in said second element, and said second coupling portion is an arm on said one flyweight which is adapted to enter into said recess when said flyweights move from said rest position to said coupling position.

8. A centrifugal coupling, comprising a driven first rotatable element; a rotatable second element which is to be entrained by said first element; a pair of pivotable flyweights each having a center of gravity; interengaging portions provided on said flyweights and operative for enforcing pivoting of said flyweights in mutually opposite directions between a rest position and a coupling position; cooperating coupling portions on said second element and at least one of said flyweights, said coupling portions being engaged only when said flyweights are in said coupling position; and pivot means mounting said flyweights in the regions of said interengaging portions on said first element for pivoting about respective pivots which are spaced from one another transversely of the axis of rotation of said first element by a distance which is so selected that imaginary straight lines passing through the respective pivot and the center of gravity of the associated flyweight extend in substantial parallelism with a plane of symmetry passing midway between said pivots through said axis of rotation when said coupling portions are engaged with one another, whereby said flyweights cannot be influenced, when in said coupling position, by forces resulting from tangential acceleration and by forces resulting from acceleration which acts transversely of the axis of rotation of said first element.

* * * * *